Dec. 7, 1926.

J. ROBSON 1,609,833

LOCOMOTIVE ENGINE

Filed Dec. 12, 1921  8 Sheets-Sheet 1

INVENTOR.
John Robson

BY *Lovka, Kehlenbeck & Mathé*

ATTORNEYS

Dec. 7, 1926.                                                      1,609,833
                    J. ROBSON
              LOCOMOTIVE ENGINE
            Filed Dec. 12, 1921          8 Sheets-Sheet 3
*Fig. 4.*                    *Fig. 5.*
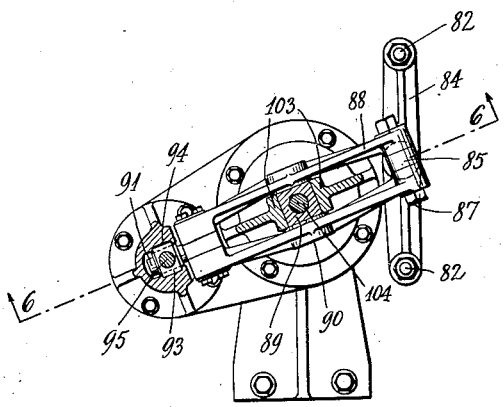
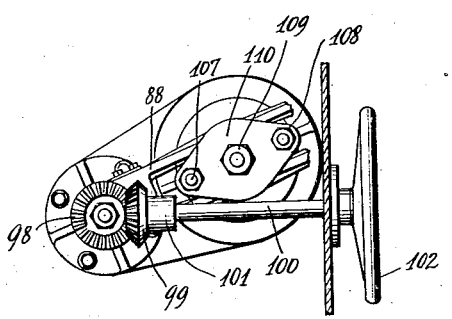
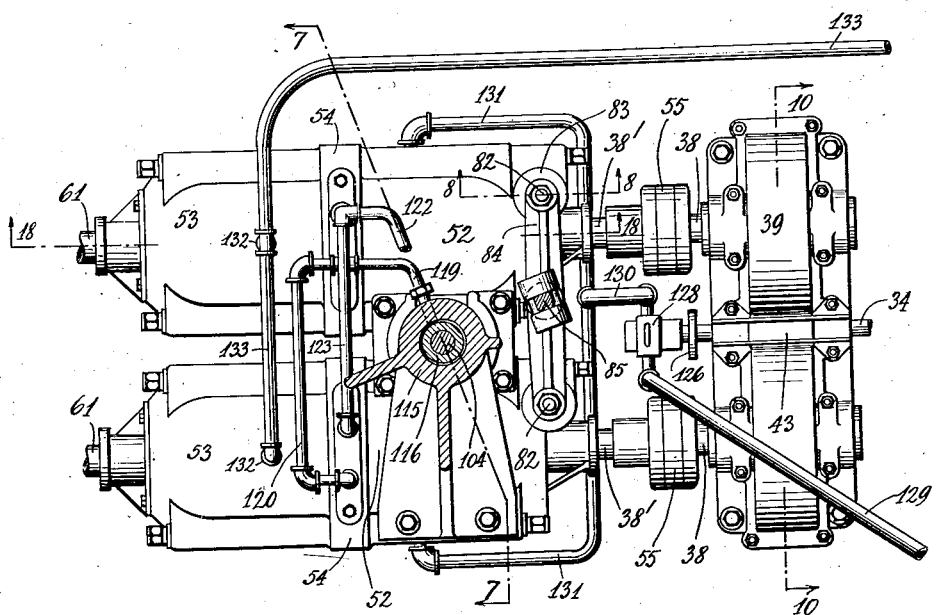
*Fig. 3.*
INVENTOR.
John Robson
BY Lotka, Kehlenbeck & Mathé
ATTORNEYS.

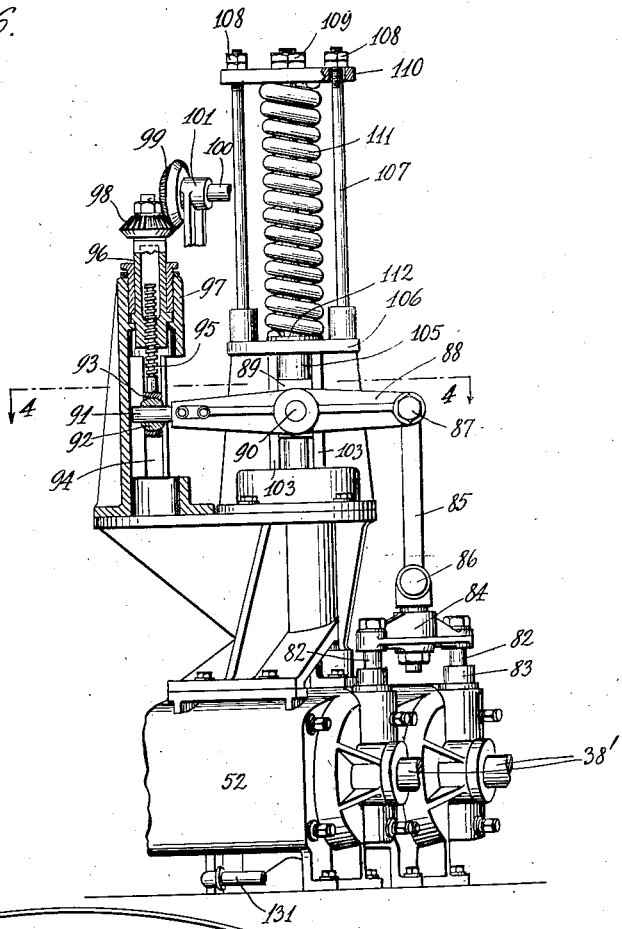

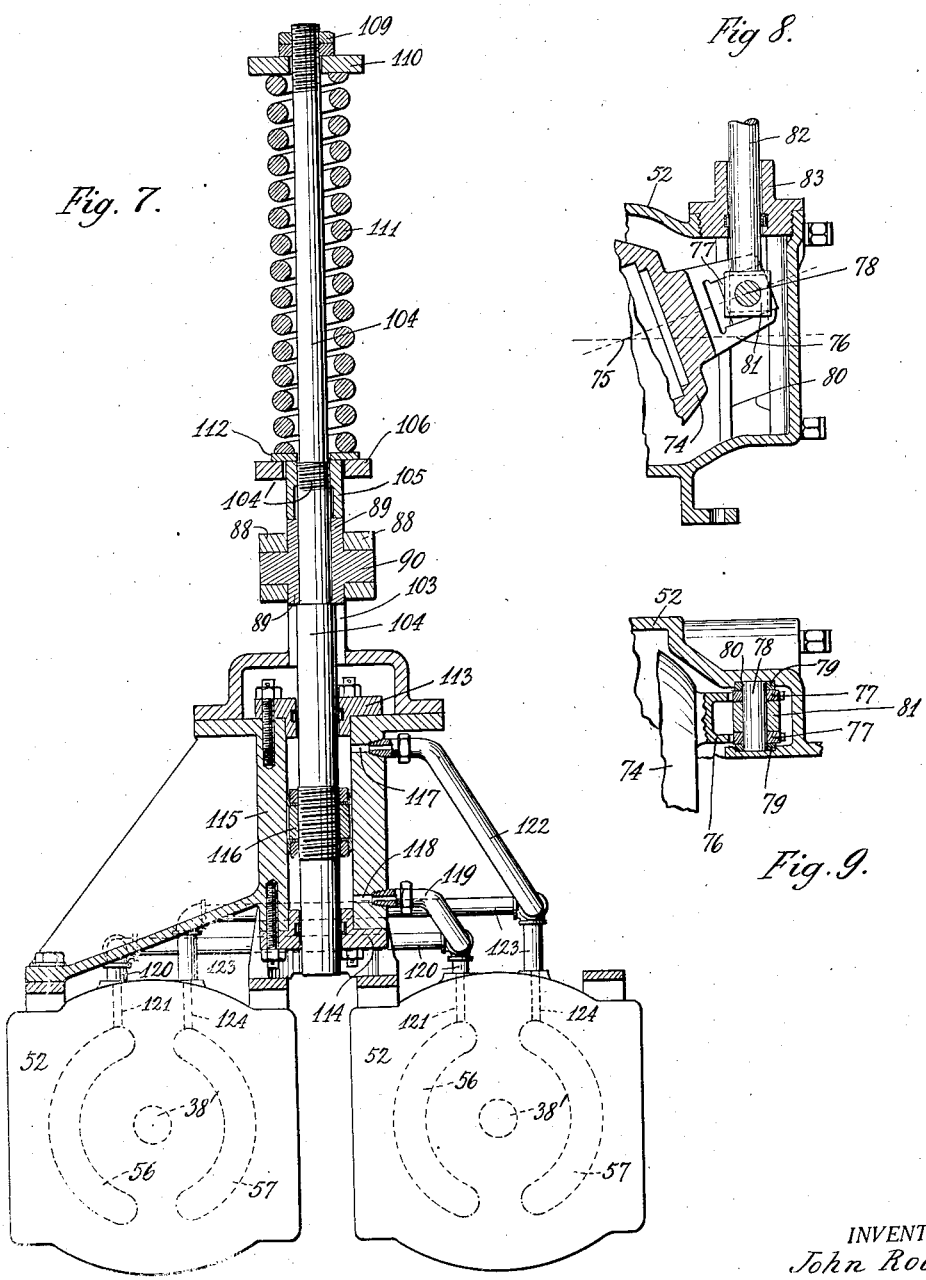

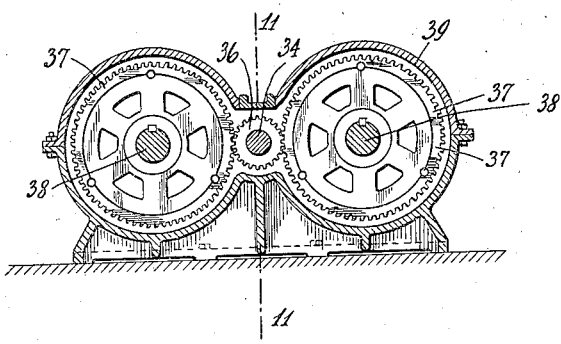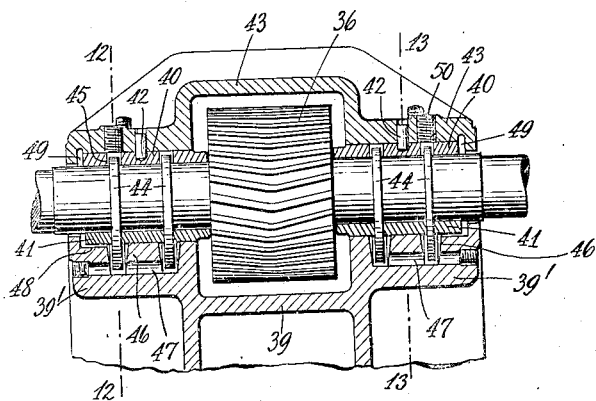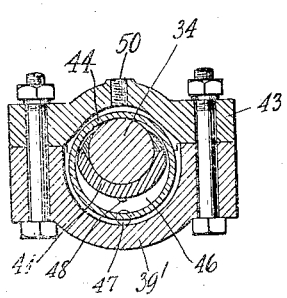

Dec. 7, 1926.  1,609,833

J. ROBSON

LOCOMOTIVE ENGINE

Filed Dec. 12, 1921      8 Sheets-Sheet 8

INVENTOR.
John Robson
BY
Lotka, Kehlenbeck & Mathé
ATTORNEYS.

Patented Dec. 7, 1926.

1,609,833

UNITED STATES PATENT OFFICE.

JOHN ROBSON, OF WATERBURY, CONNECTICUT, ASSIGNOR TO UNIVERSAL ENGINEERING CORPORATION, OF MONTREAL, QUEBEC, CANADA, A CORPORATION OF CANADA.

LOCOMOTIVE ENGINE.

Application filed December 12, 1921. Serial No. 521,570.

My invention relates to railroad engines, and has for its object to provide a locomotive adapted particularly for shunting work, and very flexible in its operation, particularly in regard to change and control of speed. It has been my aim to devise an efficient and compact engine of this character, which will be driven by an internal combustion motor, and various features of my invention relate to means by which the operation of such motor will be rendered very reliable, and the speed of the locomotive adjusted readily. Other features and advantages of my invention will be explained in the detailed description following hereinafter, and the novelty will be defined in the appended claims. It will be understood that certain features of my invention, as will appear from the said claims, are novel broadly, that is to say, irrespective of their use in conjunction with other features of the invention not mentioned in these particular broad claims.

Figure 1:
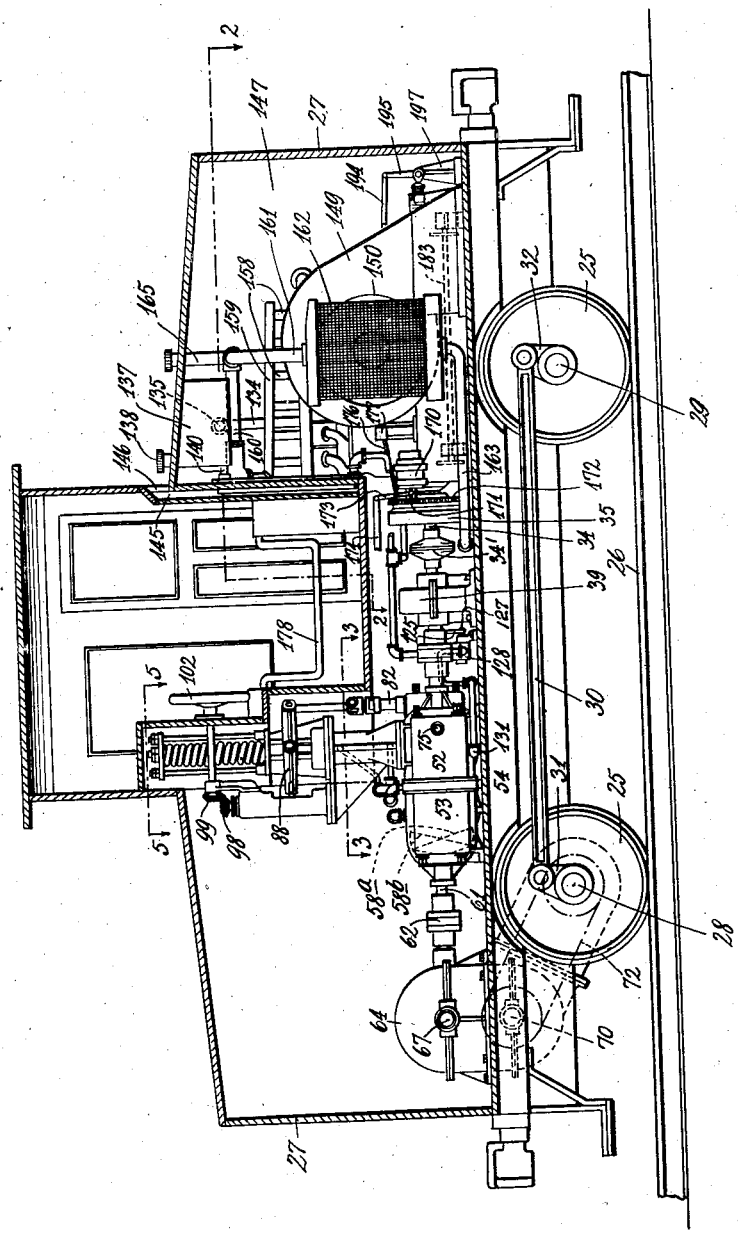
Figure 2:
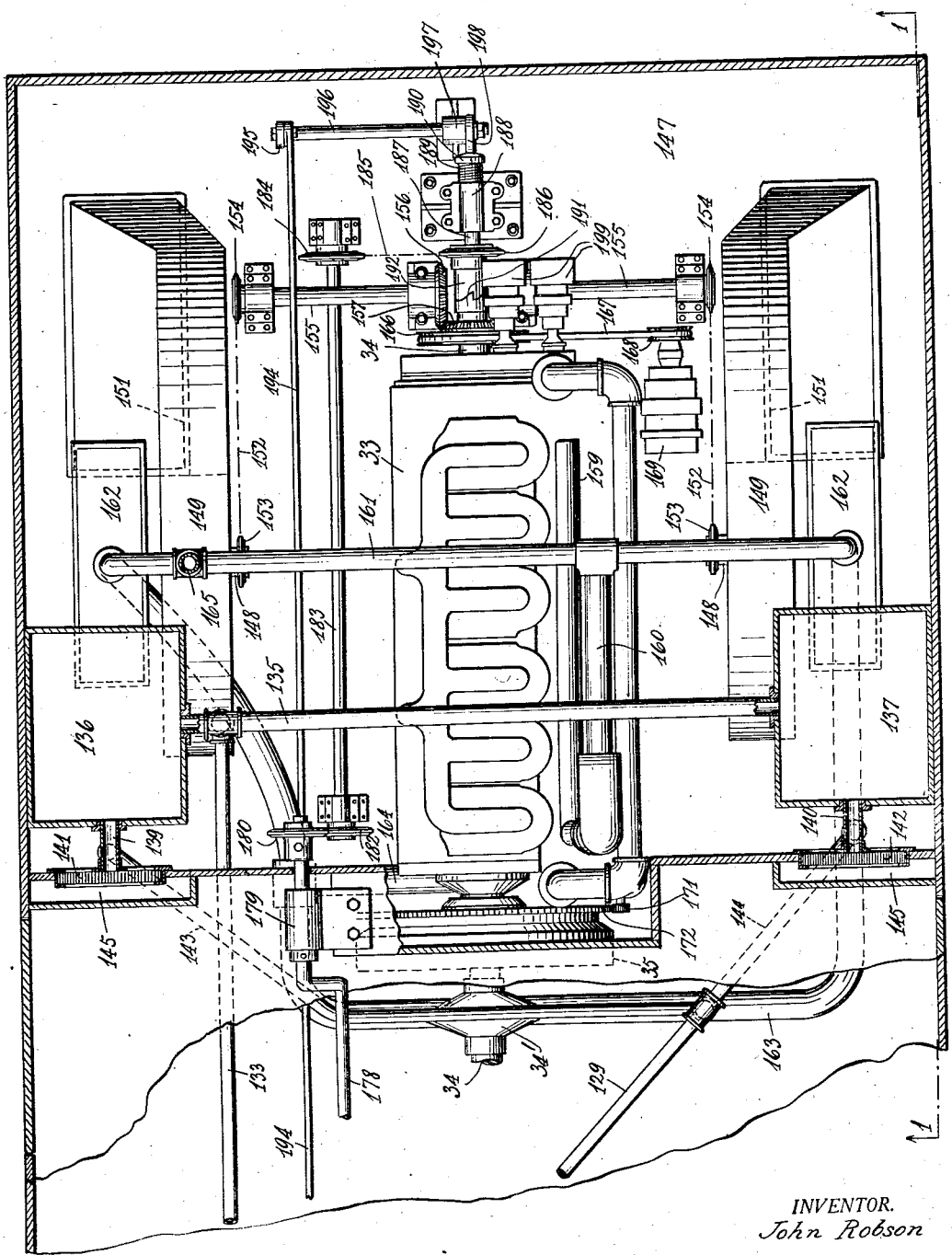
Figure 14:
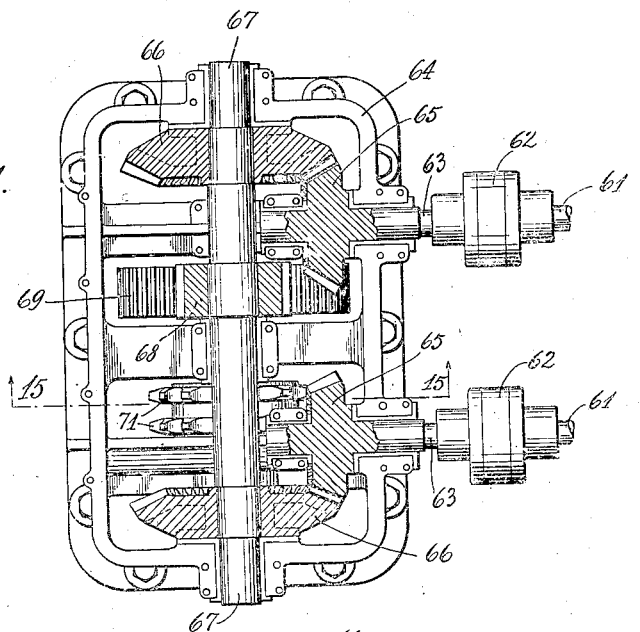
Figure 16:
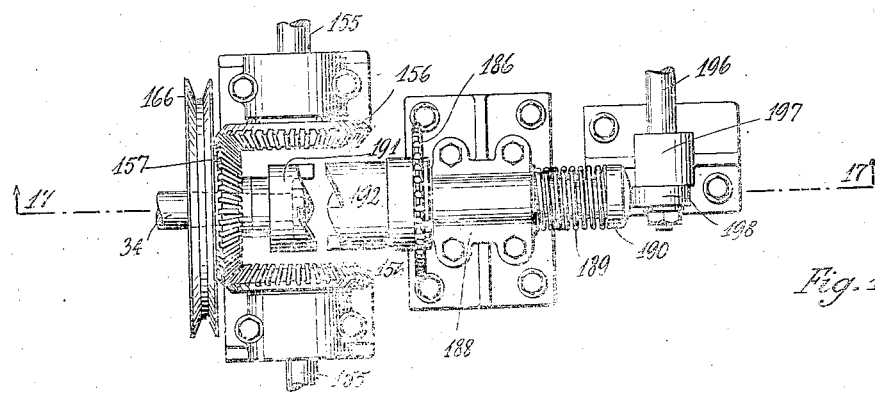
Figure 17:
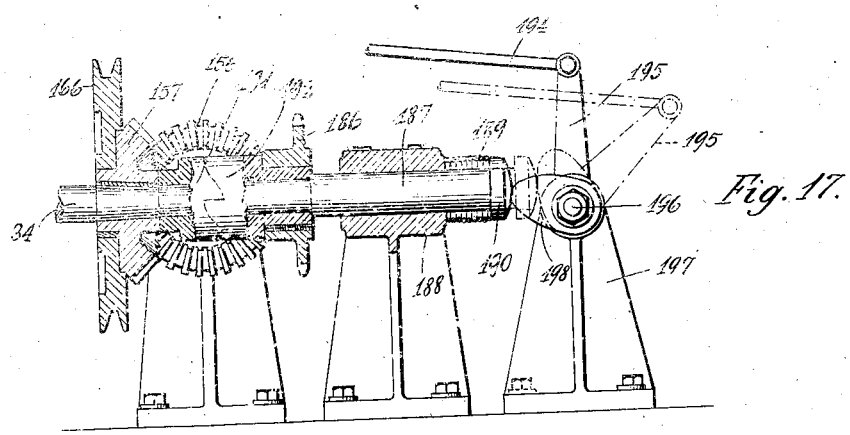
Figure 18:
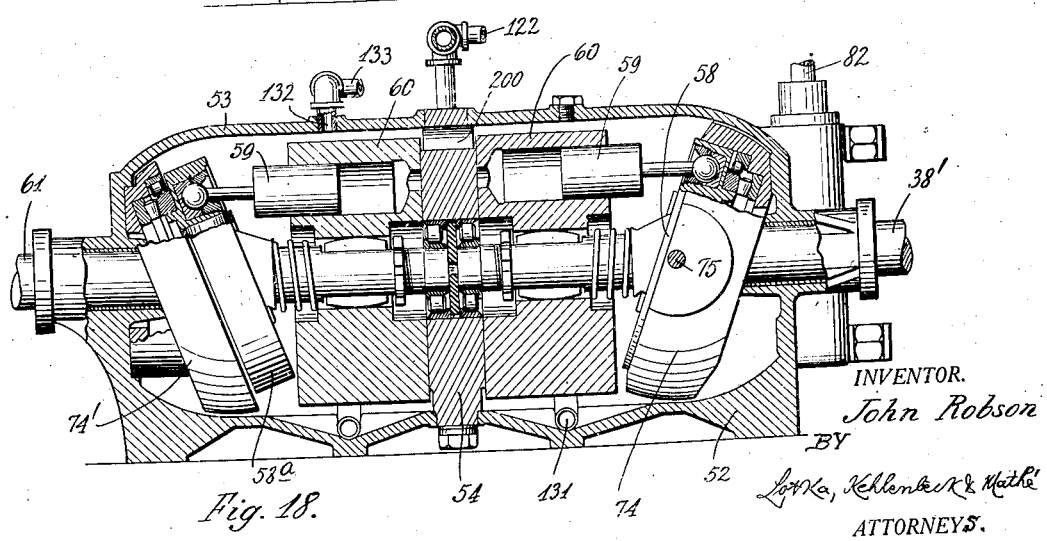

A satisfactory and preferred embodiment of this invention is shown, by way of example, in the accompanying drawings, in which Fig. 1 is a side elevation of such shunting locomotive, with the body in section largely along one of the side walls as indicated at 1—1 in Fig. 2, but partly along the longitudinal center of the engine; Fig. 2 shows, upon an enlarged scale, a plan view of the rear end of the locomotive, with parts in section substantially on the line 2—2 of Fig. 1; Fig. 3 is a plan view of a portion of the locomotive immediately in front of the one shown in Fig. 2, with the body omitted and with parts in section on the line 3—3 of Fig. 1; Fig. 4 is a detail showing certain parts in horizontal section on the line 4—4 of Fig. 6; Fig. 5 is a detail plan view partly in section on the line 5—5 of Fig. 1; Fig. 6 is an elevation with parts in section on line 6—6 of Fig. 4; Fig. 7 is in its lower portion, an elevation of part of the locomotive, looking forward, and in its upper portion a section substantially on the line 7—7 of Fig. 3; Fig 8 is a detail vertical section substantially on the line 8—8 of Fig. 3; Fig. 9 is a horizontal section through the parts shown in Fig. 8 but represents these parts in a different position; Fig. 10 is a partial vertical section on the line 10—10 of Fig. 3; Fig. 11 is a vertical section on the line 11—11 of Fig. 10; Figs. 12 and 13 are vertical sections on the lines 12—12 and 13—13 respectively of Fig. 11; Fig. 14 is a plan view of certain parts near the front end of the locomotive, with a gear case cover omitted and parts in horizontal section on the line 14—14 of Fig. 15, the latter being a vertical section substantially on the line 15—15 of Fig. 14; Fig. 16 shows upon an enlarged scale, in plan view, parts of a starting mechanism located at the rear end of the locomotive; Fig. 17 is a vertical section substantially on the line 17—17 of Fig. 16; Fig. 18 is a vertical section substantially on the line 18—18 of Fig. 3; and Fig. 19 is a partial rear end elevation of the locomotive.

The shunting locomotive illustrated by the accompanying drawings comprises wheels 25 of usual character adapted to run on the rails 26, and a frame or body 27 suitably supported on the axles 28, 29. The front axle 28 is driven by a gasoline engine, as described below, and the front wheels are held to turn with said axle. The rear wheels (which are rigid on the rear axle 29, although this is not essential) are driven from the front wheels by means of connecting rods 30 extending from cranks 31 on the front axle 28 to cranks 32 held to turn with the rear wheels.

At the rear portion of the locomotive, I have shown the gasoline engine 33, of any suitable construction, which furnishes the power for propelling the locomotive. The engine shaft 34, which extends horizontally in the longitudinal center of the locomotive is provided with a fly-wheel 35 and, in advance thereof, with a pinion 36, preferably of double helical or herring bone character (see Fig. 11), in mesh with two large gear wheels 37 mounted on horizontal longitudinal shafts 38, which, like this portion of the engine shaft 34, are journaled in a housing 39. I thus obtain the requisite speed reduction between the engine shaft 34 and the shafts 38.

A special construction for the proper lubrication of the shaft 34 in the housing 39 is shown in Figs. 11, 12, and 13. At each side of the pinion 36, the shaft 34 runs in bearing sleeves or brasses made in sections 40, 41 and held against longitudinal movement and against rotation, for instance by pins 42 extending through holes in the cap 43 and into sockets in the upper sections 41. The upper portion of the shaft 34 engages loosely rings 44 of considerably larger diameter than said shaft (Fig. 12), and the brasses, particularly their upper sections 40, are provided with suitable slots or openings 45 to enable said rings to hang in a position eccentric to the shaft, while at the same time preventing movement of said rings lengthwise of the shaft. The lower portions of said rings 44 hang within recesses 46 formed in the lower portions 39' of the bearings. The rings 44 pick up and distribute oil as they are given a rolling motion by contact with the rotating shaft. The recesses 46 on the same side of the pinion 36 communicate with each other by a longitudinal duct 47 arranged at the bottom of said recesses. The outermost recesses 46 are also in communication, by longitudinal ducts 48, with annular chambers 49 at the outer ends of the bearings. These chambers together with the ducts 47, 48, recesses 46, and slots 45 form oil chambers to which a lubricant is supplied through openings 50, shown in registry with two of the slots 45. Generally, the openings 50 are threaded for connection with pipes leading to two of the oil cups indicated at 51 in Fig. 19; these parts may be of usual construction, and other ways may be employed if desired, for supplying oil to the openings 50.

The shafts 38, which rotate in the same direction, and at the same velocity, constitute the drive shafts for two hydraulic variable speed gears the housings of which are indicated at 52, 53. Each of these gears comprises a pump, located in the housing 52 which is on the same side of the midplate 54 as said shafts 38, and a fluid motor located in the housing 53 on the other side of the midplate and set in motion by the stream of fluid which is delivered by such pump, and returns from the motor to the suction port of the pump. The housings of the pumps are indicated at 52, and the motor housings at 53. I have not illustrated all the details of this hydraulic power-transmission device for the reason that in its main features it is well-known, devices of this type being disclosed in Harvey D. Williams' Letters Patent of the United States No. 925,148 dated June 15, 1909, and No. 1,044,838 dated November 19, 1912. The pump shafts 38' might be integral with the drive shafts 38, although in the example illustrated I have indicated a suitable clutch connection 55 between each shaft 38 and the pump shaft 38' aligning therewith. In Fig. 7, I have indicated by dotted lines the two segmental ports 56, 57 with which the midplates 54 are provided as described in the patents referred to above; as set forth in said patents, one of said ports constitutes a suction port for the pump, and the other a delivery port, and whether 56 or 57 shall be the suction port depends on the direction in which the pump rotates and also on the direction in which the driving member or so-called swash-plate 58 of the pump is inclined relatively to a transverse vertical plane. As described in said patents, as the swash-plate 58 rotates with the shaft 38', it produces a reciprocation of pistons 59, in a pump barrel 60 rotating with said shaft, the stroke of the pistons depending on the inclination of said plate. The fluid motor contained in the housing portion 53 is of the same type as the pump, except that the swash-plate of the motor, which rotates with the driven shaft or motor shaft 61 is generally arranged to turn at a fixed angle, that is, its inclination is not adjustable. All this is well-known from the patents mentioned above and others of the same type. In the present machine, the swash-plate of one motor is inclined in one direction, as indicated at 58$^a$ in Fig. 1, while the swash-plate of the other motor is inclined in the opposite direction, as indicated at 58$^b$, with the result that while the two shafts 38 rotate in the same direction, the two shafts 61 will rotate in opposite directions.

From the motor shafts 61, power is transmitted by a reduction gear to the front axle 28 as follows: The shafts 61 are connected by suitable couplings 62 with parallel shafts 63, in line with the respective motor shafts, journalled in suitable bearings of a gear case or box 64. Each of the shafts 63 carries rigidly a bevel pinion 65 in mesh with bevel gears 66 secured rigidly to a transverse horizontal shaft 67 likewise journaled in the gear box 64. Since the pinions 65 rotate in opposite directions, they are made to engage the gears 66 on opposite sides, so as to obtain a proper drive. On the shaft 67 is also secured a spur pinion 68 in mesh with a spur gear 69 on a lower transverse shaft 70 carrying a double sprocket 71 from which power is transmitted to the front axle 28 by a roller chain 72 running to a corresponding double sprocket 73 on said axle.

The pump swash-plates 58 rotate on adjustable boxes 74 pivoted at 75 while the motor swash-plates 58$^a$ and 58$^b$ rotate on stationary inclined tracks or boxes 74', the box 74' of one motor being inclined oppositely to that of the other motor, corresponding to the opposite inclinations of the swash-plates 58$^a$, 58$^b$. The position of the tracks or boxes 74 is always the same in one pump as in the other, but both tracks or boxes 74 may be adjusted simultaneously about the transverse horizontal axis 75, either to a neutral position in which the swash-plates 58 will be perpendicular to the shafts 38, 38', 61 so that the barrels 60 will rotate without any reciprocation of the pump pistons 59, or to positions inclined in one direction or the other, and in various degrees, whereby the corresponding fluid motors will be operated to rotate in one direction or the other, and at various speeds. According to the adjustment of the pump boxes 74, the shaft 67 and axle 28 will therefore be rotated for either forward or rearward travel of the locomotive, at various speeds, or the locomotive will not be driven at all, notwithstanding the rotation of the pump barrels 60, if the pump tracks or boxes 74 are in the neutral position above referred to.

The mechanism for the simultaneous and equal adjustment of both pump tracks or boxes 74, so that each of them will always be in the same position with reference to the pump shaft as the other track or box, is preferably constructed as shown in Figs. 3 to 9. The box or track 74 is formed at one side with a double forked extension 76 forming guideways in sliding engagement with two blocks or members 77 having parallel surfaces to engage the said guideways, said blocks being mounted pivotally on a transverse horizontal pin 78. The said guideways are parallel to a line connecting the axis 75 with the center of the pin 78, see Fig. 8. On the outer ends of said pin are mounted slide blocks 79 having vertical edges in engagement with vertical guide grooves 80 of the housing 52. The central portion of the pin 78 extends through an enlargement 81 at the lower end of a vertical rod 82 guided in a stuffing box 83. In order to compel the rods 82 of the two pumps to move in unison, their upper ends are connected by a cross head 84. A link 85 has its lower end connected with said cross head by a horizontal pivot 86, and another pivot 87 parallel to 86 connects the upper end of the link 85 with a lever 88 fulcrumed on a block 89 to swing about an axis 90 parallel to 86 and 87. The lever 88 is made with an extension 91 in the shape of a cylindrical rod having a longitudinally sliding fit within a ball 92 fitted loosely in a corresponding socket 93. This socket has vertical surfaces in engagement with stationary vertical guideways 94, and is also provided with an upwardly-extending vertical rod 95 screw-threaded to fit an internal thread in a sleeve or nut 96. This sleeve is mounted in stationary bearing 97 in such a manner as to allow the sleeve to rotate while preventing its longitudinal motion. The upper end of the sleeve carries a bevel wheel 98 in mesh with a similar wheel 99 on an adjusting shaft 100 journaled in stationary bearings 101 and provided with a hand wheel 102 within convenient reach of the engineer. By turning this wheel the engineer will control the speed of the locomotive and the direction of travel.

The fulcrum block 89 is generally stationary, but will, under certain conditions specified below, shift either up or down along stationary vertical guideways 103 with which said block is in sliding engagement. For this purpose, the block is secured to a vertically-movable upright rod 104, having a shoulder against which the lower end of the fulcrum block 89 is held by a nut 105 engaging the upper end of said block and screwed on a threaded portion 104' of said rod. The nut 105 is adapted to slide through an opening in a stationary bar or plate 106 (Fig. 7) from which extend upwardly at each side of the rod 104, two stationary vertical rods 107 provided at the top with stops 108 which may be adjustable, for instance, by making them as nuts, as shown. A similar stop 109 is provided at the upper end of the rod 104, and the lower surfaces of the three stops are adapted for engagement with a bar or cross head 110, through which the rods 104, 107 pass with a sliding fit. The lower face of the cross head 110 is engaged by the upper end of a spring 111 coiled around the rod 104, the lower end of said spring engaging a washer 112 in sliding engagement with said rod 104. In the normal position of the fulcrum block 89 illustrated by Fig. 7, the washer 112 engages the upper surface of the nut 105 as well as the upper face of the stationary plate 106. The fulcrum block 89 will, however, be moved from this normal position under certain circumstances, for which purpose the following mechanism has been provided:

The lower portion of the rod 104 is guided oil-tight in heads 113, 114 at the ends of a cylinder 115, and carries a piston 116 movable in said cylinder. The upper compartment of this cylinder has a port 117, and a like port 118 is provided in the lower compartment. One of these ports, for instance 118, is connected with the midplate ports 56 of the two hydraulic variable speed gears, as by means of pipes 119, 120 and ducts 121; the other port 117, is connected with the other midplate ports 57, as by pipes 122, 123 and ducts 124. It will be seen that similarly located midplate ports of the two hydraulic devices are connected with the same compartment of the cylinder 115, and it will be understood that the said cylinder and the pipes and ducts connecting it with the midplate ports are filled with oil.

The strength of the spring 111 is such that under normal conditions, that is, as long as the oil pressure in the ports 56 or 57 (whichever happen to be the pressure ports) does not exceed a predetermined amount equivalent to the normal horse power of the engine 33, the parts will be in the position indicated in Fig. 7 and under these circumstances the lever 88 will swing on a stationary fulcrum 90 whenever the engineer operates the handwheel 102 to change or reverse the inclination of the boxes or tracks 74 of the pumps and thereby vary the speed of the locomotive, or reverse its direction of travel. The fulcrum 90 will however be shifted either up or down whenever the pressure in the pressure ports of the midplates exceeds such predetermined maximum. If the tracks 74 of the pumps are inclined in such a direction that the ports 57 are the pressure ports, then, in the event of an excessive pressure in said ports 57, such pressure will be communicated to the upper compartment of the cylinder 115, through the ducts 124, pipes 123, 122, and port 117, and, overcoming the tension of the spring 111 so as to compress it further, will act on the piston 116 to lower the rod 104 with the stop 109, cross head 110, nut 105, and fulcrum block 89, the lower end of the spring 111 remaining stationary since the washer 112 is pressed downwardly into engagement with the stationary bar or plate 106. The effect will be to lower the lever 88, swinging it on the socket 93 as a stationary fulcrum, and thereby lowering the rods 82. When, as assumed, the ports 57 are the pressure ports, the boxes or tracks 74 are inclined in the direction shown in Fig. 8, and the lowering of the rods 82 therefore will reduce the angle which the line 75—78 forms with the axis of rotation, that is, the angle at which such boxes or tracks are tilted. Now, by reducing this angle, the stroke of the pump pistons 59 is shortened, and the speed of the fluid motors reduced correspondingly, thus reducing the load on the engine. In other words, this arrangement will reduce or limit, to an amount depending on the oil pressure, the length of the stroke which it is possible to give the pump pistons by the adjustment of the handwheel 102, and in this way the load on the engine 33 will be kept more or less constant, independent of the oil pressure in the pumps and fluid motors. Should the boxes or tracks 74 be inclined in the direction opposite to that shown in Fig. 8, the ports 56 will be the pressure ports, and in the case of an excessive pressure in said ports 56, such pressure will be communicated to the lower compartment of the cylinder 115, through the ducts 121, pipes 120, 119, and port 118, and, overcoming the tension of the spring 11, will act on the piston 116 to lift the rod 104 with the fulcrum block 89, nut 105 and washer 112, the upper end of the spring 111 remaining stationary since the cross head 110 is pressed upward against the stationary stops 108. The effect in this case will be to raise the lever 88, swinging it on the socket 93 as a temporary fulcrum, and thereby lifting the rods 82. Since, as stated above, the boxes or tracks 74 of the pumps are in this case inclined in the direction opposite to that shown in Fig. 8, it follows that the lifting of the rods 82, under the circumstances described, will reduce the angle at which said tracks or boxes 74 are tilted and therefore reduce the stroke of the pump pistons 59, just as when the ports 57 are the pressure ports. The automatic regulating device 70 will therefore produce the same effect irrespective of the direction in which the pump boxes or tracks 74 are inclined and of the direction in which the swash-plates 58 of the pumps rotate. This regulating device will therefore guard against the possibility of dangerously overloading the engine 33.

The forward end of the engine shaft 34 operates, by means of a belt 125 engaging pulleys 126 (Fig. 3) and 127 (Fig. 1), an oil-circulating pump of any suitable construction, indicated at 128 in Figs. 1 and 3. Oil flows to the suction port of said pump through a supply pipe 129, and is forced by the pump into a delivery pipe 130 having branches 131 leading to the pump housings 52. It will be understood that both the pump housings 52 and the motor housings 53 are full of oil during the operation of the machine. Oil heated by the operation of the machine, is constantly withdrawn from the motor housings 53 at the top through pipes 132 connected with a pipe 133. The rear end of the latter pipe is connected with an upright pipe 134 joined at its upper end with a horizontal transverse pipe 135 connecting two reservoirs or oil expansion tanks 136, 137 located at opposite sides of the locomotive (Fig. 2). One of these tanks (or each of them if desired) is provided with a filling opening indicated at 138. The tanks 136, 137 have outlets 139, 140 respectively leading to the upper ends of radiators 141, 142 respectively, which may be of the well-known cellular type or of any other approved construction. The oil flows through these radiators downwardly, and is cooled therein; the cool oil is withdrawn at the bottom and passes from the radiators 141, 142 through pipes 143, 144 respectively to the suction pipe 129 of the circulation pump 128. The tanks 136, 137 should allow expansion of the oil, and therefore should not be air-tight, neither should they be filled to the top, but still to such a level as to insure submerging the inlets 135 and the outlets 139, 140 at all times.

The radiators 141, 142 are located adjacent to chambers 145 having air inlets 146 at their upper ends. Air from the outside passes into said chambers through said inlets, and out of them through the radiator spaces into a chamber 147 at the rear end of the locomotive. The air is set in motion by two rotary fans or ventilators having shafts 148 and housings 149, the suction inlets of these housings being in their outer walls as indicated at 150, and their outlets 151 (indicated as of rectangular shape in plan view)

discharging downwardly through the bottom of the body 27. To drive the shafts of these fans or ventilators, I have indicated chains 152 engaging sprockets 153 on the inner ends of the aligning transverse horizontal shafts 148, said chains being driven by sprockets 154 on transverse aligning horizontal shafts 155 provided with bevel wheels 156 in mesh with a similar wheel 157 on the rear portion of the engine shaft 34.

The draft produced by said fans or ventilators is also utilized to cool the water circulating in the cylinder jackets of the internal combustion engine 33. These jackets have individual water outlets 158 (Fig. 1) connected with a manifold 159 from which a pipe 160 (Fig. 2) leads to a transverse horizontal pipe 161 connected with the upper portions of radiators 162. These radiators are arranged on opposite sides of the locomotive, exteriorly of the fan casings 149 and are so placed that the air travelling into said casings, mainly in a horizontal inward direction, parallel to the shafts 148, will pass without any material deflection through the air spaces of the radiators 162, as will be obvious from Figs. 1 and 2. That is to say, the radiators will have their air-channels facing laterally of the vehicle, and not forwardly as in motor cars. The lower portions of the water-cooling radiators 162 are connected by a pipe 163, from which a pipe 164 (Fig. 2) leads to the water jacket of the engine. The radiators 162 may be filled with water through a pipe 165 extending upwardly from the pipe 161.

Figure 15:
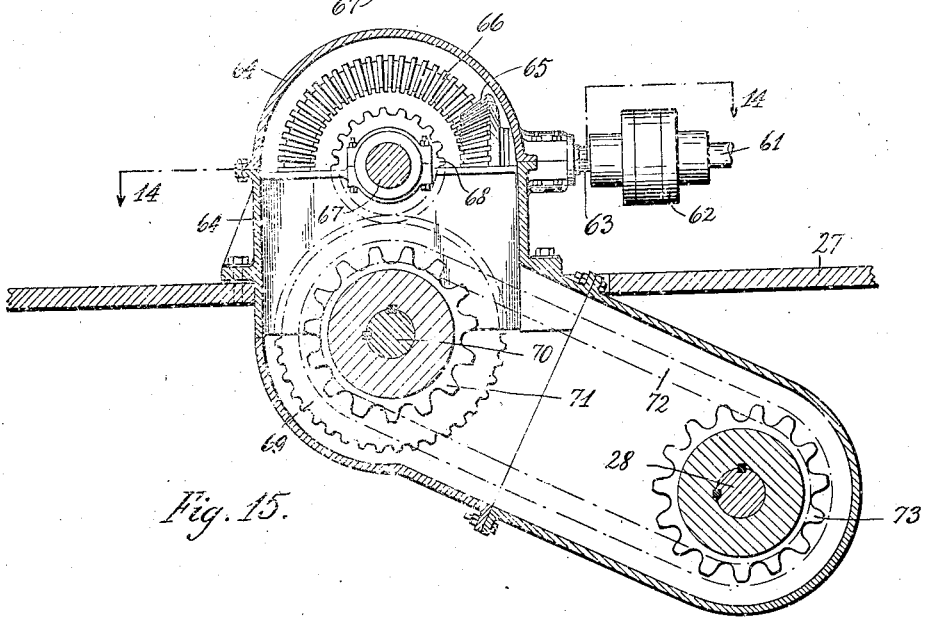

As stated above, two of the oil cups indicated at 51 in Fig. 19 are to supply oil to the engine shaft 34, at the reduction gear illustrated in detail by Figs. 10 to 13; the other cups supply oil to various other parts, particularly to the reduction and driving gear shown in detail in Figs. 14 and 15. The shaft 34 may be continuous, but is generally made in two sections connected by a coupling 34'.

As shown in Figs. 2, 16 and 17, a pulley 166 is secured to the engine shaft 34 adjacent to the bevel wheel 157, and this pulley, by means of a belt 167 and another pulley 168, drives an electric generator 169 which supplies current for lighting and other purposes.

An electric starter of usual type has been indicated in Fig. 1. It comprises an electric motor 170 the shaft of which has a clutch-controlled connection of any approved type with a pinion 171 in mesh with a spur gear 172 secured to the engine shaft 34 adjacent to the fly-wheel 35. The clutch connection is controlled by a lever 173 connected by a link 174 with a starting lever 175 located in the engineer's cab (Figs. 1 and 19). The lever 173, through a link 176, also controls a switch 177 of the well-known kind to connect the motor 170 with the usual storage battery at the time the lever 173 effects the clutch connection.

To provide means for starting the engine by hand from the engineer's cab, in case the electric starter should fail, the following arrangement may be used (Figs. 1, 2, 16, 17, and 19): A crank 178 is mounted in bearings 179, within convenient reach of the engineer, to turn about a horizontal axis extending lengthwise of the locomotive. The shaft of this crank carries at its rear end a sprocket 180 connected by a chain 181 (Fig. 19) with a sprocket 182 on a longitudinal horizontal shaft 183. At its rear end this shaft carries another sprocket 184, connected by a chain 185 with a sprocket 186 on a short shaft 187, in line with the engine shaft 34, and mounted to slide lengthwise in a stationary bearing 188. A coiled spring 189 (Fig. 2), fitted around the shaft 187 between the bearing 188 and a head or collar 190 on the shaft, normally presses said shaft rearward to the position shown in Fig. 16 and indicated by dotted lines in Fig. 17. In this position, the sprocket 186 is out of line with the sprocket 184, but the chain 185 has sufficient slack to remain in proper engagement with said sprockets. In said normal position, two clutch members 191, 192 provided on the adjacent ends of the shafts 34, 187 respectively, are out of engagement with each other. When it is desired to start the engine by hand, the engineer swings a lever 193 (Fig. 19) and thus through the medium of a longitudinal link 194 and an arm 195 rocks a shaft 196 journaled in a bearing 197. This shaft carries a short arm 198 adapted to press the head 190 forward so as to bring the clutch members 191, 192 into engagement as shown in Fig. 17. In this position, the arm 198 has a sufficient lever action to hold the head 190 against the tension of the spring 189, but will not prevent the rearward movement of said head when the engine begins to run and forces the clutch member 192 by turning faster than this member is being rotated by hand. That is to say, as soon as the engine begins to run, the clutch members and other parts will automatically resume the original normal position shown in Fig. 16.

In Fig. 2, I have shown at 199 two magnetos driven in any suitable manner and supplying the ignition current for the engine.

It will be understood that the housings 52, 53 of the pumps and motors respectively are filled with the motive fluid (oil), as is customary in hydraulic gears of this character, and form reservoirs for such motive fluid, to replenish the pump or motor cylinders and to receive any leakage from them, in a manner described more fully in the patents referred to above. These two reservoirs of the same gear, are in communication with each other by the passage 200 provided in the midplate or valve plate 54, so that a complete circulation path, external to the pump and motor, will be formed by said housings 52, 53 and passage 200 in connection with the parts 131, 132, 133, 134, 135, 136, 137, 139, 140, 141, 142, 143, 144, 129, 128, 130 and 131. The pumps and motors will thus be kept relatively cool by the fluid circulating through said path and cooled in the radiators 141, 142. This circulation path is a double path having branches for the two hydraulic variable speed gears, and for the two radiators 141, 142, but the portion 129, 128, 130, 133, 134, 135 is common to both paths.

I claim as my invention:

1. In a power-transmitting device, a pump, a motor, two paths connecting said pump with said motor and serving respectively for the passage of the fluid from the pump to the motor, to drive the latter, and for the return of the fluid from the motor to the pump, means for continuously circulating an auxiliary supply of motive fluid through a path, all portions of which are located externally of the first-named two paths connecting the pump and motor, and a cooler included in such circulation path.

2. In a power-transmitting device, a pump, a motor, two paths connecting said pump with said motor and serving respectively for the passage of fluid from the pump to the motor, to drive the latter, and for the return of the fluid from the motor to the pump, and means for cooling said pump and motor including a housing enclosing said pump and serving as a reservoir for an auxiliary supply of the motive fluid, another housing enclosing said motor and likewise serving as a reservoir for the motive fluid, a circulation path externally of said housings for said auxiliary supply of motive fluid, said circulation path having a supply connection leading to said pump housing, and an outlet connection leading from said motor housing; a cooler included in said circulation path and means for maintaining a continuous circulation of fluid through said circulation path.

3. In a power-transmitting device, a pump, a motor, two paths connecting said pump with said motor and serving respectively for the passage of fluid from the pump to the motor, to drive the latter, and for the return of the fluid from the motor to the pump, separate housings enclosing the pump and the motor respectively and serving as reservoirs for an auxiliary supply of fluid, a circulation path located externally of said housings for said auxiliary supply including a supply connection leading to one of said housings, a connection between said housings, an outlet connection leading from the other housing, a cooler, and means to cause a current of air to pass across said cooler.

4. In a power-transmitting device, a pump, a motor, two paths connecting said pump with said motor and serving respectively for the passage of fluid from the pump to the motor, to drive the latter, and for the return of fluid from the motor to the pump, connected housings enclosing the pump and the motor respectively and containing an auxiliary supply of fluid, a path for circulating said supply of fluid externally of said housings, including a supply connection leading to one of said housings, an outlet connection leading from the other housing, an expansion tank, a cooler, and means for continuously circulating said supply of fluid through said path.

5. In a locomotive, an internal combustion engine having a cooling jacket, a hydraulic variable speed gear driven by said engine, an operative connection from said hydraulic gear to the driving wheels of the locomotive, a casing enclosing said hydraulic gear, radiators disposed transversely of the locomotive at each side thereof, connections forming a path for circulating fluid through said casing and said radiators, radiators disposed lengthwise of the locomotive, at each side of the engine, connections forming a path for circulating water through the second-named radiators and through the engine jacket, and a ventilator fan common to all of said radiators for causing a cooling current of air to pass across said radiators.

6. In a locomotive, a water-jacketed internal combustion engine arranged in the longitudinal center of the locomotive, a hydraulic variable speed gear driven by said engine, a casing enclosing said hydraulic gear, a housing forming a chamber in which said engine is contained, radiators ranging transversely of the locomotive, arranged at each side thereof, in connection with said housing, connections forming a path for circulating fluid through said casing and said radiators, other radiators disposed in said chamber at each side thereof and ranging lengthwise of the locomotive, connections forming a path for circulating water through the second-named radiators and the engine jacket, fans located in said chamber adjacent to the second-named radiators to draw air through both the first-named and the second-named radiators, and an operative connection from said hydraulic gear to the driving wheels of the locomotive.

7. In a locomotive, a water-jacketed internal combustion engine arranged in the longitudinal center of the locomotive, a hydraulic variable speed gear driven by said engine, a casing enclosing said hydraulic gear, a housing forming a chamber in which said engine is contained, radiators ranging transversely of the locomotive, disposed at each side thereof, in connection with said housing, expansion tanks located in said chamber adjacent to said radiators, connections forming a path for circulating fluid through said casing, said radiators, and said expansion tanks, other radiators disposed in said chamber at each side thereof and ranging lengthwise of the locomotive, connections forming a path for circulating water through the second-named radiators and the engine jacket, fans located in said chamber between each of the second-named radiators and the engine, to draw air both through the first-named and the second-named radiators, and an operative connection from said hydraulic gear to the driving wheels of the locomotive.

8. In a power-transmitting device, a pump, a motor operated by the fluid propelled by said pump, a casing enclosing said pump and said motor, a cooler, an expansion tank, connections forming a path for circulating a fluid through said casing, said cooler, and said expansion tank, and means for continuously circulating said fluid through said path.

9. In a power-transmitting device, a pump, a motor operated by the fluid propelled by said pump, a casing enclosing said pump and said motor, an expansion tank having an inlet connected with the outlet of said casing, a cooler having an inlet connected with the outlet of said expansion tank, a return connection from the outlet of said cooler to the inlet of said casing, and means for continuously circulating an auxiliary supply of fluid through said expansion tank, cooler, and connections.

10. In a power-transmitting device, a pump, a motor operated by the fluid propelled by said pump, a fluid-reservoir enclosing said pump and said motor, a path, every portion of which is external to said pump and said motor, means for continuously circulating an auxiliary supply of fluid through said path and reservoir, a cooler included in said circulation path and means for causing a cooling current of air to be passed across said cooler.

In testimony whereof I have signed this specification.

JOHN ROBSON.